United States Patent [19]
Nichols

[11] 3,939,561
[45] Feb. 24, 1976

[54] PIPE CUTTING MECHANISM

[76] Inventor: Amon Nichols, 20802 N. 36th Ave., Glendale, Ariz. 85308

[22] Filed: June 21, 1974

[21] Appl. No.: 481,530

[52] U.S. Cl. .................................. 30/107; 82/4 C
[51] Int. Cl.² ........................................ B23D 21/08
[58] Field of Search ....................... 82/4 C; 30/107

[56] References Cited
UNITED STATES PATENTS

| | | | |
|---|---|---|---|
| 695,482 | 3/1902 | O'Neill et al. ........................ | 30/107 |
| 747,942 | 12/1903 | Colom et al. ......................... | 30/107 |
| 920,451 | 5/1909 | Frykman .............................. | 30/107 |
| 2,695,449 | 11/1954 | Chauvin .............................. | 30/107 |

Primary Examiner—Leonidas Vlachos
Attorney, Agent, or Firm—Herbert E. Haynes, Jr.

[57] ABSTRACT

A tool for cutting pipe from the inside includes a mounting plate for supporting an arbor and coaxially locating that arbor within the bore of the pipe. The arbor is axially adjustable and has a cutting head mounted on one end thereof. The cutting head includes a pair of cutter blades which are radially extendable and which sever the pipe upon manual rotation of the tool.

4 Claims, 8 Drawing Figures

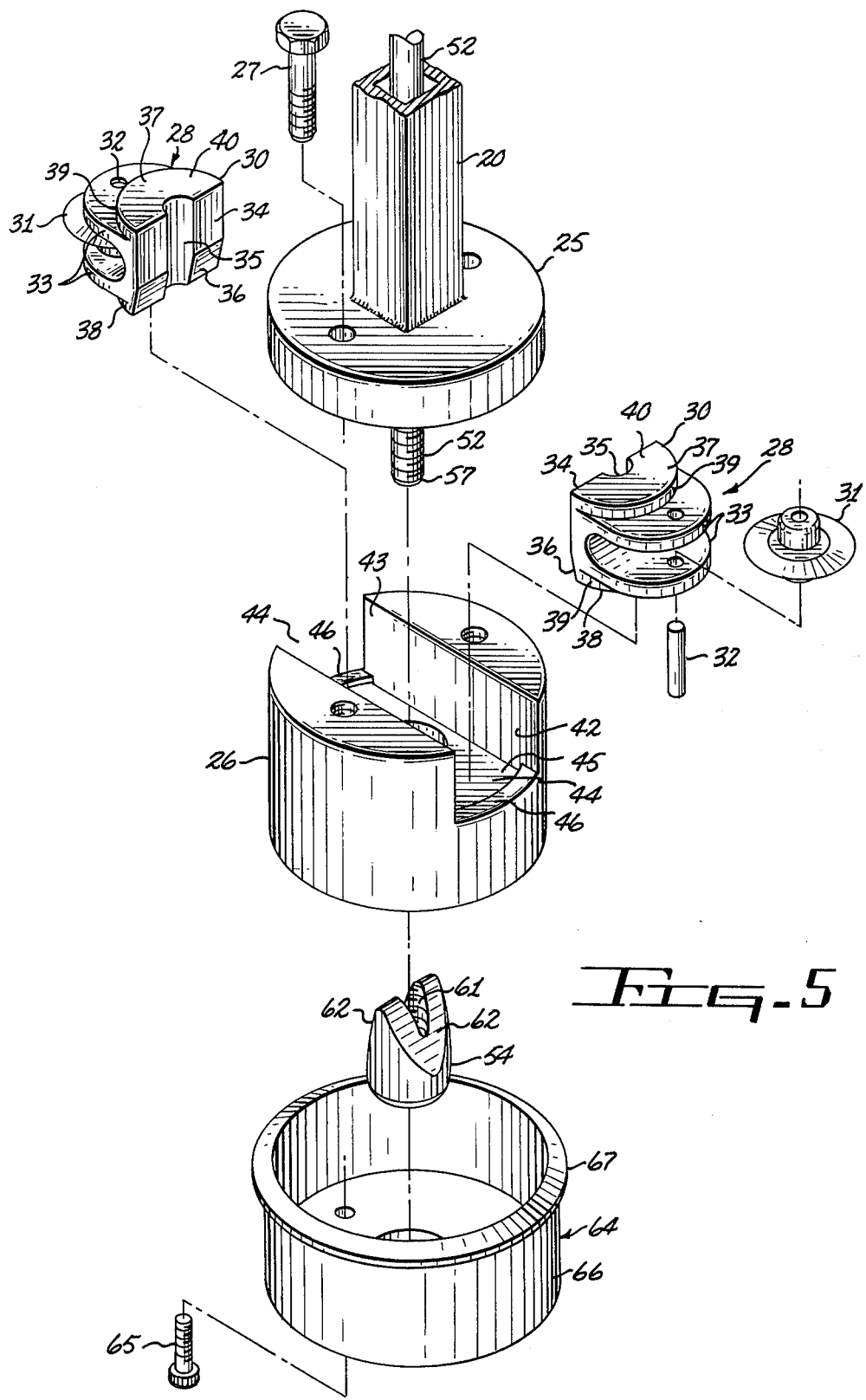

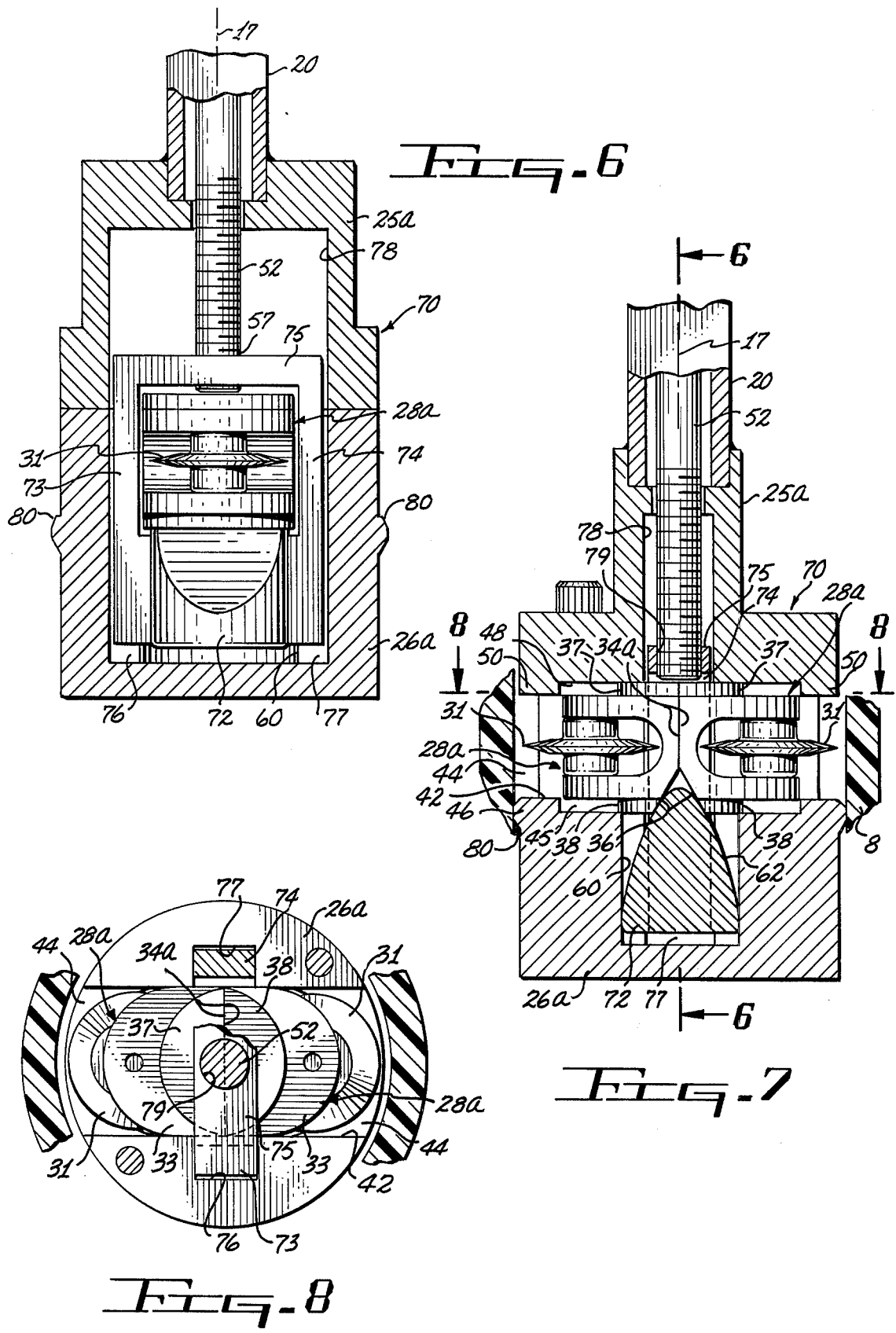

PIPE CUTTING MECHANISM

BACKGROUND OF THE INVENTION

1. Field of the Invention

This invention relates to pipe cutting mechanisms and more particularly to a mechanism for cutting pipe from the inside thereof.

2. Description of the Prior Art

Tools for cutting pipe, tubing, conduit and the like are well known in the art with many such devices having been devised for particular applications, particular pipe material and for particular ranges of pipe diameters.

Normally, pipes are cut from the outside with a cutting tool which is rotated therearound to produce an ever deepending circular cut until the pipe is severed. In many applications, the external type of pipe cutter is entirely satisfactory, however, oftentimes it is impractical or otherwise undesirable to employ this type of mechanism.

By way of example, cutting the pipe from the outside can be impractical on a construction site when the pipe has been installed in a floor, ceiling or wall structure. In such installations when an error occurs, such as pipe or fixture misalignment, or other dimensional errors, it is often necessary to cut the pipe flush or below the surface of the structure in which the pipe has been previously installed so that corrective measures can be taken. To employ an external pipe cutter under circumstances of this nature would require dismantling of some types of structures such as wood, and the destruction of portions of such structures as wall board and concrete to provide sufficient room for rotation of the cutting mechanism.

Internal pipe cutting devices have been devised for use in situations such as that described above, however, several problems exist which have hampered the development and commercial acceptance of such mechanisms.

One such problem arises from the materials of which the pipe is fabricated. If the pipe is made of a hard material, such as asbestos-cement, considerble forces are exerted during the cutting operation, and accurately made rigid supporting mechanisms are needed to withstand such forces. Therefore, many prior art mechanisms have been very bulky and expensive.

Another problem which has kept many prior art devices from achieving commercial acceptance is the various sizes of pipe which need to be cut from the inside. Several adjustable devices have been devised to cut pipe of various diameters and various wall thicknesses. Due to such factors as cutter blade travel, the need for supporting the cutter mechanism relative to the bore of pipe, and the cutting forces exerted, tools which can be adjusted to cut various sizes of pipe are inherently complex, expensive and bulky. This may be more easily seen upon consideration of the factor of cutter blade travel. In general, such devices employ a plurality of cutter assemblies, made up of cutter wheels and suitable carriages, which are radially extendable, by means of a suitable expander mechanism, into engagement with the bore of the pipe. Thus, to cut a pipe having a relatively large inside diameter with a tool that can also fit into and cut a pipe having a relatively small inside diameter requires that the cutter assemblies be capable of moving a considerable distance. Therefore, the cutter assembly supporting and guiding structures must be capable of accommodating the required amount of travel, the expander mechanism must be capable of producing the needed travel and the entire tool must have sufficient structural strength to be able to withstand the forces exerted. An additional consideration is that the cutter assemblies must not be allowed to have excessive amounts of deflection or an uneven or jagged cut results. The problem of supporting the cutter assemblies to prevent deflection thereof becomes more complex when the assemblies are required to travel large distances.

A typical type of prior art mechanism for cutting pipe from the inside includes three cutting assemblies each having a cutting wheel or blade mounted on a suitable carriage. The cutter assemblies are carried in equally spaced radial increments within a cutting head. A cone shaped expanding mechanism is positioned between the inwardly disposed ends of the cutter assemblies, and the assemblies will radially extend and retract in response to movements of the cone therebetween. An example of this type of mechanism may be seen in U.S. Pat. No. 442,125 issued to F. Levasseur on Dec. 9, 1890. This mechanism, and others of similar structure, require that a relatively large cutter head be employed to accommodate the three cutting assemblies and the cone which spaces the cutter assemblies apart in their retracted positions. Thus, this type of prior art structure is limited to use on pipes having a relatively large inside diameter.

In view of the above, it may be seen that prior art cutting tools are comparatively complex, bulky, and in some instances expensive mechanisms with the bulk factor being of considerable importance as it prohibits the use of such tools in relatively small pipe.

Therefore, a need exists for a new and useful tool for cutting pipe from the inside which eliminates some of the problems of the prior art.

SUMMARY OF THE INVENTION

In accordance with the present invention, a tool for cutting pipe from the inside is disclosed as including a mounting plate having an arbor mounted thereon. The mounting plate is rotatably mountable on the end of a pipe, and when in this position will coaxially locate the arbor within the bore of the pipe. The arbor is fixed for rotation with the mounting plate and is axially slidable in a line normal to the plate and may be locked in various positions along that line so that a cutter head carried on one end of the arbor may be moved to various depths within the pipe and locked. The cutter head is demountably attached to the end of the arbor and employs a pair of diametrically opposed radially movable cutter assemblies which are in abutting engagement with each other in the retracted position so as to reduce to a minimum the size of the cutter head needed to support the cutter assemblies. The cutter assemblies are radially movable by an expander means which, in one embodiment of the present invention, passes between the abutting surfaces of the cutter assemblies via an opening formed for that purpose. In an alternate embodiment, the expander means is configured to circumscribe the cutter assemblies to allow a still further reduction in the size of the cutter head.

The tool of the present invention is adapted to cut only one size of pipe to minimize the problems of cutter assembly travel, supporting and guiding the cutter assemblies, supporting and guiding of the cutter head relative to the bore of the pipe and the like. The cutter head is designed so that it can be easily removed from the arbor and replaced with another size head to accommodate another size of pipe. Alternately, the same head can be modified, by means of component substitution, so as to employ the same head for various sizes of pipe.

Accordingly, it is an object of the present invention to provide a new and useful pipe cutting mechanism.

Another object of the present invention is to provide a new and useful tool for cutting pipe from the inside.

Another object of the present invention is to provide a new and useful tool for cutting pipe from the inside which employs a pair of diametrically opposed radially extendable cutter assemblies which are in abutting engagement with each other when in the retracted position to reduce to a minimum the size of the cutter head which supports the cutter assemblies. Another object of the present invention is to provide a new and useful tool for cutting pipe from the inside thereof which includes a cutter head that is easily replaceable with a different size cutter head to accommodate pipes of various diameters.

Another object of the present invention is to provide a new and useful tool for cutting pipe from the inside thereof which inclides a cutting head that can be modified by means of component substitution so that a single cutting head may be easily adapted to cut pipe of various diameters.

Still another object of the present invention is to provide a new and useful tool of the above described character in which the cutting head supports a pair of diametrically opposed cutter assemblies which are radially extendably mounted within a channel formed in the cutter head, the channel being adapted to limit the amount of cutter assembly travel, guide and support the cutter assemblies at all positions thereof and minimize cutter assembly deflection.

The foregoing and other objects of the present invention, as well as the invention itself, may be more fully understood from the following description when read in conjunction with the accompanying drawings.

BRIEF DESCRIPTION OF THE DRAWINGS

FIG. 5 is an isometric exploded view of the cutting head of the cutting tool of the present invention.

FIG. 6 is a sectional view of a modification of the cutting mechanism of the present invention taken on the line 6—6 of FIG. 7.

FIG. 7 is a sectional view of the modified cutting mechanism shown in FIG. 6, with this view being similar to FIG. 3.

FIG. 8 is a sectional view taken on the line 8—8 of FIG. 7.

DESCRIPTION OF THE PREFERRED EMBODIMENTS

Figure 1:
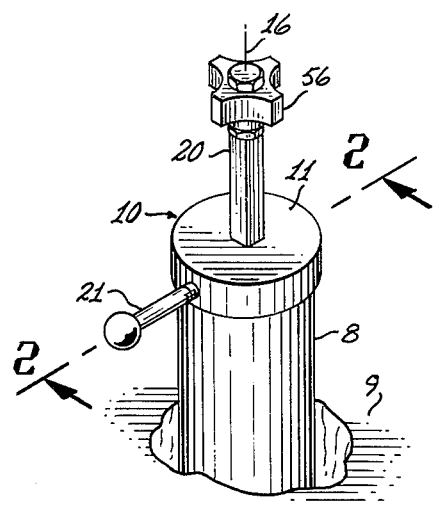
FIG. 1 is an isometric view of a typical pipe installation having the cutting mechanism of the present invention mounted thereon.

Referring more particularly to the drawings, FIG. 1 illustrates a pipe 8 as being installed within a constructed surface 9, such as the floor of a building, and extending upwardly therefrom. The pipe cutting mechanism of the present invention, which is indicated generally by the reference numeral 10, is shown as being used in that particular installation only for the purpose of placing the mechanism 10 in a working environment. Therefore, it should be understood that the pipe cutting mechanism 10 may be employed in any instance in which it would be advantageous to cut a pipe from the inside thereof.

Figure 2:
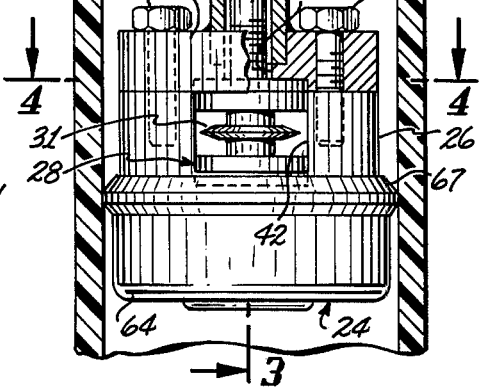
FIG. 2 is an enlarged sectional view of the pipe cutting mechanism of the present invention taken on the line 2—2 of FIG. 1.

As best seen in FIG. 2, the pipe cutting mechanism 10 includes a mounting plate 11 which is adapted to be placed in abutting engagement with the end 12 of the pipe 8. As will become apparent from the following description, it is necessary that the plate 11 be centered upon the end 12 of the pipe 8 and for this purpose a first or lower surface of the plate 11 is formed with a reduced diameter boss 14 depending therefrom and the periphery of the boss 14 is sized to coincide with the inside diameter of the pipe 8 so that the plate 11 is provided with a shoulder 15 that abuttingly engages the end 12 of the pipe. It should be noted that the plate 11 could be formed with a plurality of concentric grooves (not shown) so that a single mounting plate can be centered on various sizes of pipe. Thus, it should be apparent that a multi-grooved plate (not shown) can be employed, or the mounting plate 11 can be replaced with a plate of similar construction, but which is sized differently, so that the cutting mechanism 10 can be modified for use on various sizes of pipe as will hereinafter be described in detail.

The plate 11 is mounted on the end 12 of the pipe 8 so as to be rotatable about the longitudinal axis 16 of the pipe. Therefore, the plate 11 must be centered so that the axis 17 of the plate is coaxial with the longitudinal axis 16 of the pipe.

It is desirable that the cut to be made by the pipe cutting mechanism 10 be formed in a plane which is normal to the longitudinal axis 16 of the pipe so that the newly formed end (not shown) will be square as it is sometimes referred to in the art. To accomplish this, the end 12 of the pipe 8 must be normal to the axis 16, that is, the end 12 must be square, so that the plate 11 which is bearing against that end can be rotated in a normal plane. In the event that the end 12 is not square, or is otherwise irregular, that end can be reworked to meet this desirable condition by techniques well known in the art.

It should be noted that if the end 12 of the pipe 8 is located in a particular installation so that it is inaccessible, or at least inconvenient, to mount the plate 11 thereon, an extension pipe (not shown) can be coupled to the pipe 8 such as by using a conventional union (not shown). The extension, of course, should be mounted coaxial with respect to the pipe 8 so that the resulting cut will be square.

The mounting plate 11 is provided with an aperture or bore 19 formed therethrough which is coaxial with respect to the axis 17 of the plate. An arbor 20 is axially slidably mounted in the bore 19 of the plate 11 and is thus movable in a line normal to the plate along the longitudinal axis 16 of the pipe 8. The arbor 20 may be locked against sliding movement by locking means in the preferred form of a threaded handle 21. The handle 21 is mounted within a threaded bore 22 formed in the plate 11 and is disposed to transversely intersect the axial bore 19 of the plate. Thus, the handle 21 is threadably movable into and out of engagement with the arbor 20 and also serves as means by which the cutting mechanism 10 may be gripped for manual rotation.

As shown, the arbor 20 is a hollow tubular structure preferably of square cross sectional configuration, and the axial bore 19 is also of square configuration. Thus, the arbor 20 is inherently fixed for rotation with the plate 11 and a flat surface is provided for the handle 21 to bear against. It should be obvious that this could be accomplished by other means such as a keyed shaft having a machined flat thereon (not shown).

The depending end of the arbor 20 is adapted to demountably carry a cutting head thereon which is indicated generally by the reference numeral 24. The cutting head 24 includes an adapter plate 25 which is suitably fixed to the depending end of the arbor 20 such as by welding. A cylindrical housing 26 is demountably attached to the adapter plate 25 such as with suitable bolts 27. It will be noted that both the plate 25 and the housing 26 are of circular configurations and are coaxial with the arbor 20, the mounting plate 11 and thus, when the cutter mechanism 10 is in position on the pipe 8, are also coaxial with the longitudinal axis 16 of the pipe. The adapter plate 25 and the housing 26 are formed, as will hereinafter be described in detail, to supportingly carry a pair of diametrically opposed radially extendable cutter assemblies 28.

As seen best in FIG. 5, each of the cutter assemblies 28 include a carriage 30 having a cutter wheel 31 rotatably mounted thereon such as with an axle pin 32. The carriages 30 are identical and have clevis members 33, the spaced apart arms of which extend laterally from the carriages for rotatably carrying the cutter wheels 31 therebetween. The opposite side or end 34 of each of the carriages 30 is formed in a substantially flat configuration which has a semicircular in cross section groove 35 formed therein and an inclined surface 36 formed on the lower portion thereof. It will be noted that the longitudinal axis of the grooves 35 are parallel to the axis of rotation of the cutter wheels 31 mounted in their respective ones of the carriages 30. Each of the carriages 30 are provided with an upwardly extending segment 37 and a depending segment 38 which are identically configured in that each has an arcuate side edge 39 and a flat end surface 40. The purpose for the grooves 35, inclined surfaces 36 and the segments 37 and 38 will become apparent as this description progresses.

Figure 3:
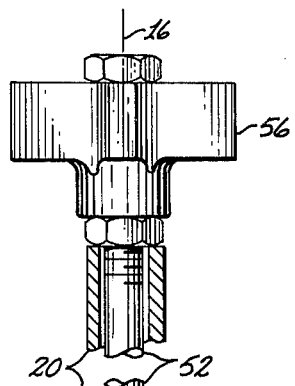
FIG. 3 is an enlarged fragmentary sectional view taken on the line 3—3 of FIG. 2.
Figure 3:
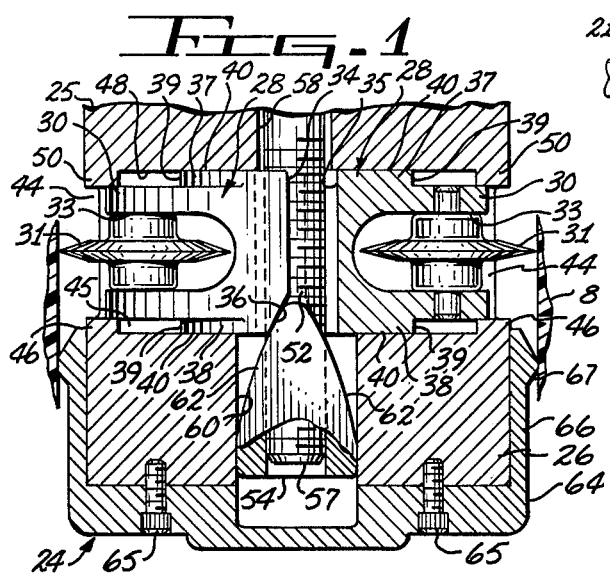
Figure 4:
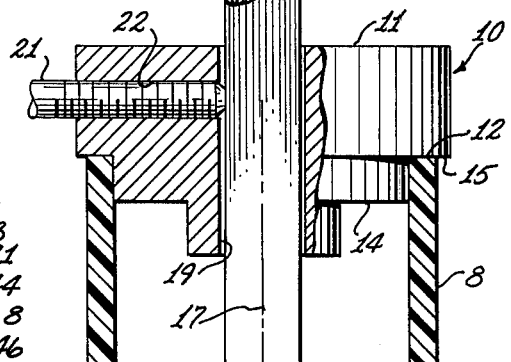
FIG. 4 is an enlarged sectional view taken on the line 4—4 of FIG. 2.
Figure 4:
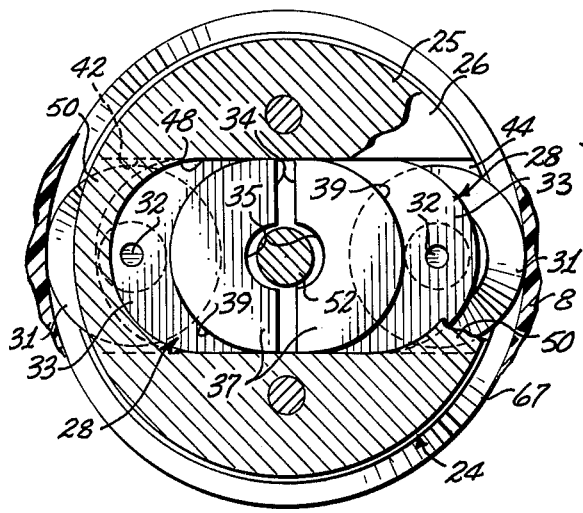

The cutter assemblies 28 are mounted in a back-to-back relationship within a channel 42 provided in the cylindrical housing 26. The channel 42 is transverse to the longitudinal axis of the housing 26 and is open at the top 43 and at the opposite ends 44 thereof. The bottom of the channel 42 is provided with a flat bottom recessed groove 45 which is closed at its opposite ends to form arcuate ledges 46. As best seen in FIG. 3, the depending segments 38 of the carriages 30 extend into the groove 45 so that the flat surfaces 40 of the segments 38 slidingly engage the flat bottom surface of the groove and the arcuate edges 39 of the segments are movable into engagement with the arcuate ledges 46 of the groove 45.

A recessed groove 48 is formed in lower surface of the adapter plate 25, and that groove 48 is identical to the groove 45 formed in the housing 26 in that the groove 48 has a flat upper surface which is closed at its opposite ends to form arcuate ledges 50. The upwardly extending segments 37 of the carriages 30 extend into the groove 48 so that the flat surfaces 40 of the segments 37 slidingly bear on the flat upper surface of the groove and the arcuate edges 39 of the segments are movable into engagement with the arcuate ledges of the groove.

The cutter assemblies 28 are slidingly supported within the channel 42 and the grooves 45 and 48 and are movable from a retracted position where the flat surfaces 34 of the carriages 30 are in abutting engagement with each other to an extended position where the arcuate edges 39 of the carriages 30 are in contact with the arcuate ledges 46 and 50 of the housing 26 and the plate 25, respectively. Thus, the cutter wheels 31 are retracted within the open ends 44 of the channel 42 when the cutter assemblies are in their retracted positions to allow insertion of the cutter head 24 within the pipe 8. The cutter wheels 31 will move outwardly into engagement with the inside diameter of the pipe as the cutter assemblies are moved toward their extended positions and this extending movement of the cutter wheels 31 is stopped at a point somewhat beyond the outer periphery of the pipe 8 by the carriages reaching their respective extended positions.

It will be noted that by mounting the cutter assemboies 28 as described above and by limiting the travel of the cutter assemblies 28 to an amount somewhat more than the wall thickness of the pipe 8, complete control and support is provided at each position of the cutter assemblies so that any possibility of cutter wheel deflection, resulting from the forces exerted in cutting the pipe, is virtually eliminated.

Movements of the cutter assemblies 28 are produced by an expander means in the form of an elongated rod 52 and a wedge member 54. The rod 52 is axially mounted in the arbor 20 so as to protrude from the opposite ends thereof. The upwardly protruding end of the rod 52 has a knob 56 suitably mounted thereon, and the downwardly protruding end 57 of the rod 52 is threaded. The rod 52 extends downwardly from the arbor 20 through the axial bore 58 formed in the adapter plate 25 and passes between the cutter assemblies 28 by means of the opening provided by the semicircular grooves 35 formed in the carriages 30. The wedge member 54 is vertically movably mounted within an axial bore 60 formed in the cylindrical housing 26 below the channel 42 thereof. The wedge 54 is provided with a threaded bore 61 for receiving the threaded lower end 57 of the rod 52 therein. The wedge 54 has a pair of cam surfaces 62 on the opposite side edges thereof and which are each disposed to align with the inclined surfaces 36 of the carriages 30. Manual rotation of the knob 56 will cause the wedge member 54 to move upwardly in the axial bore 60 so that the cam surfaces 62 will bear against the inclined surfaces 36 of the carriages 30.

It may now be seen that the cutter assemblies 28 may be caused to extend radially in diametrically opposed directions by manual rotation of the knob 56 of the expander means in one direction, and retraction of the cutter assemblies can be accomplished by rotating the knob in the reverse direction. It should be pointed out that when the direction of the knob 56 is reversed to retract the cutter assemblies 28, oftentimes the rod 52 will move upwardly rather than the wedge member 54 moving down. This is due to the forces exerted which cause the wedge member 54 to become stuck or clamped between the cutter assemblies 28. This condition may be overcome by tapping the top of the knob 56, such as with the palm of the hand, so as to drive the wedge member down.

The diameters of the adapter plate 25 and the cylindrical housing 26 are selected to be somewhat smaller than the inside diameter of the pipe 8 and a cap 64 is demountably secured to the housing 26 to provide means by which the cutter head 24 is centrally supported relative to the inside diameter of the pipe. The cap 64 is secured to the lower end of the housing 26 such as by screws 65 and has an upwardly extending circular side wall 66 in which the housing 26 is nestingly seated. The uppermost end of the side wall 66 is formed with an outwardly protruding annular ring 67 which engages the inside diameter of the pipe.

It may now be seen that the cutter head 24, as shown and thus far described, is adapted to cut only one side of pipe due to the fixed size of the head supporting ring 67 and due to the limited travel of the cutter assemblies 28 as hereinbefore described.

The pipe cutting mechanism 10 of the present invention can be adapted to cut pipe of larter diamters by completely replacing the cutting head 24 with one of a larger size or by component substitution within the existing cutter head 24. In either event, a larger head supporting ring would be needed to match the inside diameter of the pipe to be cut, and the cutter assemblies would need clevis members which extend further from their respective carriages to place the cutter wheels adjacent the inside diameter of the pipe when the cutter assemblies are in their retracted positions.

Reference is now made to FIGS. 6, 7, and 8 wherein a modified form of the pipe cutting mechanism of the present invention is illustrated. In this embodiment, the previously described cutter head 24 has been replaced by a cutter head 70 of reduced diameter so that pipe of relatively smaller inside diameter can be severed with the pipe cutting mechanism of the present invention.

A fixed factor which determines the minimum size of pipe which can be cut is the wall thickness of the pipe. The wall thickness dictates the amount of cutter assembly travel needed and also dictates the minimum size of the cutter wheels to insure that a cutter blade of sufficient diameter is provided to cut through the pipe wall. Therefore, a reduction in the physical size of the cutting head must be accomplished without effecting the cutter wheel size and the amount of travel of the cutter assemblies.

In the embodiment shown in FIGS. 6, 7, and 8, the reduced diameter of the cutting head 70, as compared to the previously described cutting head 24, is made possible by eliminating the need for passing the rod 52 between the cutter assemblies. As will become apparent as the description progresses, neither the cutter wheel diameter nor the cutter assembly travel has been reduced in the cutter head assembly 70.

The cutter head 70 is similar to the previously described cutter head 24, thus, only the elements which have been modified will be identified with different reference numerals and will be described in detail.

The wedge 72 of the cutter head 70 is formed with a bail like structure which includes arms 73 and 74 that extend laterally and upwardly from the wedge and are interconnected at their uppermost ends with a transverse cross bar 75. The wedge 72 is axially movable in the bore 60 of the cylindrical housing 26a which has diametrically opposed axially extending guide slots 76 and 77 extending radially from the bore 60. The guide slots 76 and 77 are adapted to receive the arms 73 and 74 which are vertically movable therein. The adapter housing 25a has a rectangular slot 78 extending upwardly from the bottom surface thereof and which is aligned with the guide slots 76 and 77 of the housing 26a to slidingly receive the arms 73 and 74 as well as the cross bar 75 of the wedge 72 upon upward movement thereof.

The cross bar 75 is provided with a threaded bore 79 into which the lower end 57 of the rod 52 is threadingly inserted. Thus, the wedge 72 is moved within the cutter head 70 in the same manner as previously described in reference to the wedge 54 of the cutter head 24, with the difference being that in the modified embodiment the rod 52 is attached to the cross bar 75 rather than directly to the wedge which eliminates the need for passing the rod between the cutter assemblies.

Since no provision must be made for passing the rod 52 between the cutter assemblies 28a of the cutter head 70, these cutter assemblies can be modified to decrease the distance from the flat surfaces 34a to the axis of rotation of the cutter wheels 31 thereof. Therefore, when the cutter assemblies 28a are in the retracted position, that is, the flat surfaces 34a thereof are in abutting engagement with each other, the cutter wheels 31 will be closer to the longitudinal axis 16 of the pipe than was possible with the previously described cutter assemblies 28, and accordingly, the cutter head 70 can be of smaller diameter than the cutter head 24.

It should be noted that the cylindrical housing 26a of this embodiment is shown as having a head centering and support ring 80 integrally formed thereon. It should be understood that head centering and support function can be accomplished with the integral ring 80, or as previously described, with a demountable cap 64 having the ring 67 thereon.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A mechanism for cutting pipe from the inside comprising:

a. a plate rotatably mountable on the end of the pipe, said plate having an axial bore and means for axially aligning the bore of said plate with the longitudinal axis of the pipe when said plate is mounted on the end thereof;

b. an elongated tubular arbor axially slidable within the bore of said plate and fixed for rotation with said plate;

c. means on said plate for locking said arbor against axial sliding movement relative to said plate;

d. a cutter head on one end of said arbor, said cutter head comprising, an adapter plate transversely affixed to one end of said arbor and having a recessed groove with closed ends formed in the surface thereof which faces away from said arbor and having a substantially rectangular slot extending from the recessed groove toward said arbor, said adapter plate having an axial bore formed therethrough which communicates with the interior of said tubular arbor, and a housing demountably attached to said adapter plate, said housing having an open ended channel formed in the end thereof which faces said adapter plate and having a recessed groove with closed ends formed in the bottom of the channel thereof, the channel and the groove of said housing extending in the same direction as the groove of said adapter plate, said housing having an axial bore formed therein and a pair of diametrically opposed axially extending guide slots radially extending from the axial bore thereof, the guide slots of said housing in alignment with the rectangular slot of said adapter plate in a plane transverse with respect to the extending direction of the channel and recessed groove of said housing and the recessed groove of said adapter plate;

e. a pair of cutter assemblies mounted in oppositely facing directions within said cutter head, said pair of cutter assemblies in abutting engagement with each other for positioning thereof in a retracted position within the periphery of said cutter head, said pair of cutter assemblies radially movable in diametrically opposite directions to an extended position of protruding beyond the periphery of said cutter head; and f. expander means within said cutter head and passing around said pair of cutter assemblies and extending from said cutter head through said arbor, said expander means axially movable to engage and radially move said pair of cutter assemblies from the retracted to the extended position thereof.

2. A mechanism for cutting pipe from the inside as claimed in claim 1 wherein each of said pair of cutter assemblies comprise:

a. a carriage having a clevis member extending laterally from one end and a substantially flat surface on the opposite end, said carriage having an inclined surface portion formed on the flat surface thereof; and b. a cutter wheel rotatably mounted in the clevis member of said carriage with the axis of rotation parallel to the plane of the flat surface of said carriage.

3. A mechanism for cutting pipe from the inside as claimed in claim 2 wherein said carriage further includes an upwardly extending segment and a depending segment formed thereon for guiding and limiting the movement of said carriage within said cutter head.

4. A mechanism for cutting pipe from the inside as claimed in claim 1 wherein said expander means comprises:

a. a wedge having a pair of cam surfaces formed thereon;

b. a pair of arms extending radially from said wedge in diametrically opposed directions, said arms extending upwardly from said wedge;

c. a cross bar interconnecting the upwardly extending ends of said pair of arms, said cross bar having a threaded bore formed therein;

d. an elongated rod one end of which is in threaded engagement with the threaded bore of said cross bar; and e. a knob on the opposite end of said elongated rod.

* * * * *